United States Patent
Genette et al.

(10) Patent No.: US 6,785,376 B2
(45) Date of Patent: Aug. 31, 2004

(54) METHOD FOR ENABLING INTERACTION BETWEEN A USER TERMINAL AND A SERVICE CONTROL POINT IN AN INTELLIGENT NETWORK, A RELATED SERVICE CONTROL POINT, A RELATED OPERATOR POSITION COMPUTER TERMINAL AND RELATED SOFTWARE MODULES

(75) Inventors: Michel Jose Claude Ghislain Genette, Bovesse (BE); Matthieu Henri De Parades, Versailles (FR)

(73) Assignee: Alcatel, Paris (FR)

( * ) Notice: Subject to any disclaimer, the term of this patent is extended or adjusted under 35 U.S.C. 154(b) by 551 days.

(21) Appl. No.: 09/742,371

(22) Filed: Dec. 22, 2000

(65) Prior Publication Data

US 2001/0050985 A1 Dec. 13, 2001

(30) Foreign Application Priority Data

Dec. 23, 1999 (EP) ............................................ 99403258

(51) Int. Cl.$^7$ ................................................ H04M 7/00
(52) U.S. Cl. ............................ 379/221.09; 379/265.11
(58) Field of Search ...................... 379/221.09, 221.11, 379/221.12, 265.11

(56) References Cited

U.S. PATENT DOCUMENTS 5,164,981 A   11/1992   Mitchell et al.
6,044,142 A * 3/2000   Hammarström et al. ..... 379/223
6,104,796 A * 8/2000   Kasrai ......................... 379/201

FOREIGN PATENT DOCUMENTS

EP         0 873 029 A1   10/1998

OTHER PUBLICATIONS

"Intelligent Network (IN); Intelligent Network Capability set 1 (CS1); Core Intelligent Network Application Protocol (INAP); Part 1 Protocol Specification", pp. 92–113, ETS 300 374–1, Sep. 1994.

* cited by examiner

*Primary Examiner*—Creighton Smith
(74) *Attorney, Agent, or Firm*—Sughrue Mion, PLLC

(57) ABSTRACT

A method for enabling user interaction between a user terminal, at least one service switching point and at least one service control point in an intelligent network. An operator position comprising a computer terminal is coupled to the service control point and a telephone terminal is coupled to the service switching point. If the service control point requires input data for executing a service, it sends a request to the operator position, where the operator is prompted to request the necessary information from the user that invoked the service. The service switching point establishes a connection between the user's terminal and the operator position telephone terminal. The operator handles the user interaction between the service control point and the user terminal via the operator computer terminal and the operator telephone terminal. Once the necessary information has been obtained, the operator sends the user information to the service control point.

6 Claims, 2 Drawing Sheets

FIG. 1  IN

Figure 1:
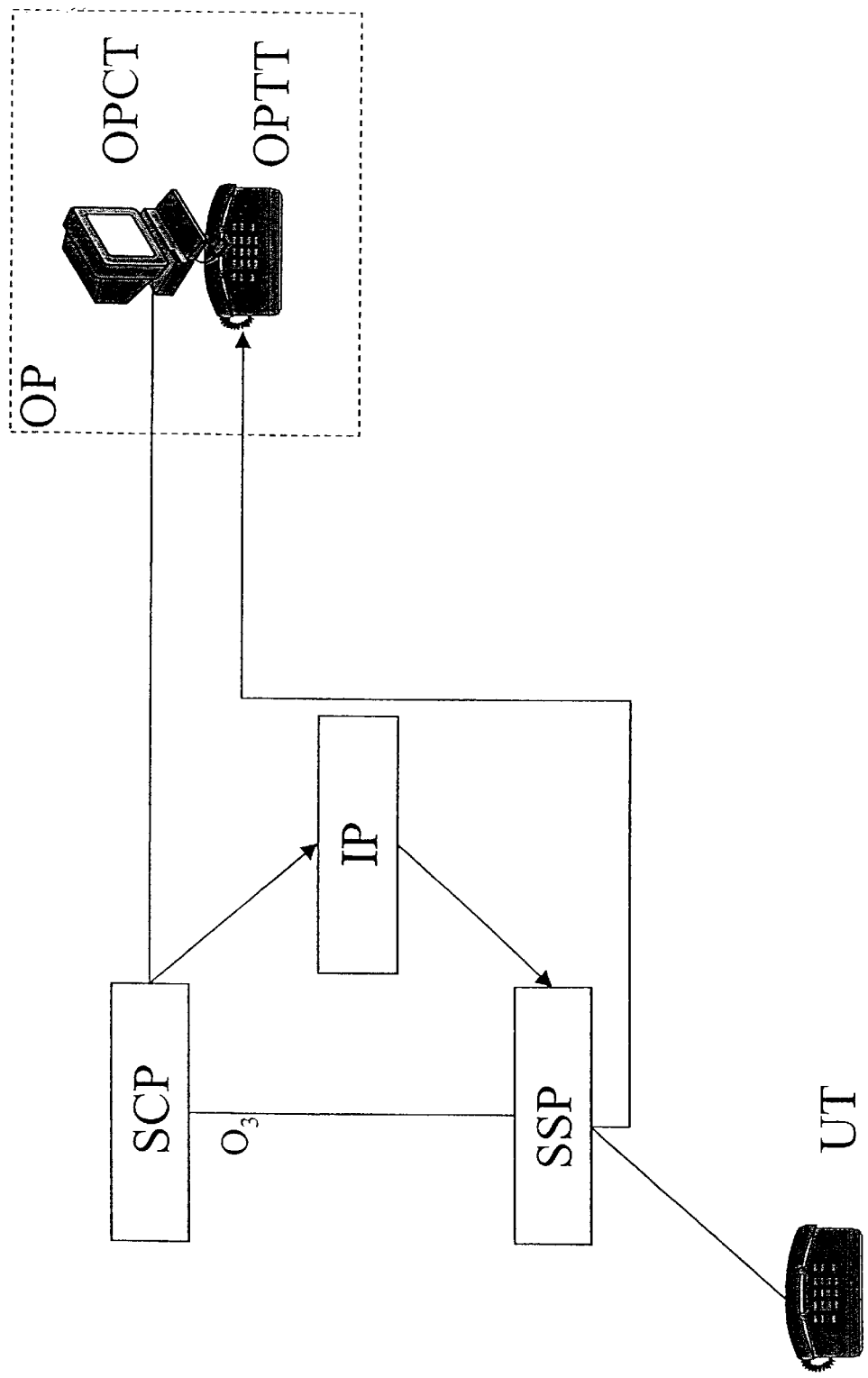

METHOD FOR ENABLING INTERACTION BETWEEN A USER TERMINAL AND A SERVICE CONTROL POINT IN AN INTELLIGENT NETWORK, A RELATED SERVICE CONTROL POINT, A RELATED OPERATOR POSITION COMPUTER TERMINAL AND RELATED SOFTWARE MODULES

The present invention relates to a method for enabling interaction between a user terminal and a service control point in an intelligent network as described in the preamble of claim 1 and a service control point as described in the preamble of claim 2.

Such a method is already known in the art, e.g. from the section SRF application entity procedures, pages 92–113 in "INTELLIGENT NETWORK (IN); INTELLIGENT NETWORK CAPABILITY SET 1 (CS1); CORE INTELLIGENT NETWORK APPLICATION PROTOCOL (INAP); PART 1 PROTOCOL SPECIFICATION" with reference ETS 300 374-1 published in September 1994 by European Telecommunications Standards Institute (ETSI). Therein, the user interaction within an intelligent network consisting of a service control point, a service switching point and an intelligent peripheral further respectively referred to as a SCP, SSP and an IP, is described. In case the service script executed by the SCP needs input from one party of the call, which may be either the calling party or the called party, for instance an account-code or an authorisation code, the SCP instructs the IP to send an announcement requesting the input and subsequently collecting the digits entered by the requested call party. The input of the requested call party is forwarded to the SCP that receives the input and proceeds executing the service script using this received input. In case of missing DTMF capabilities of the requested call party's users terminal or in case this meant requested call party user has problems with the entering of a long card number the user interaction fails, the execution of the service script is stopped and the call is consequently released. In the end the call is not successful and consequently not providing the network operator with revenues.

An object of the present invention is to provide a method and related devices of the above known type but wherein the user interaction is improved in such way that an increased number of calls succeed.

According to the invention, this object is achieved by the method as described in claim 1, the service control point as described in claim 2, the operator position computer terminal as described in claim 3 and the related software modules as described in claim 5 and claim 6.

In this way, the service control point does provide the operator, via the operator position computer terminal with the context of the call and the questions the operator needs to ask the involved party, which may be the calling party as well as the called party. In case of misunderstandings or technical problems on the side of this involved party, the operator is able to overcome these by directly communicating with the meant involved party user over an established telephone connection, under control of the service control point. The operator subsequently provides the service control point with the requested information on the involved party. The service control point then is able to proceed the execution of invoked intelligent network service with the necessary information on the involved party.

Another characteristic feature of the present invention is achieved by the call centre as described in claim 4.

By using a call centre consisting of a number of such operator positions, each containing an operator position computer terminal and a operator position telephone terminal, a number of simultaneous calls can be handled at the same time, in this way increasing the number of succeeded calls even more.

Figure 2:
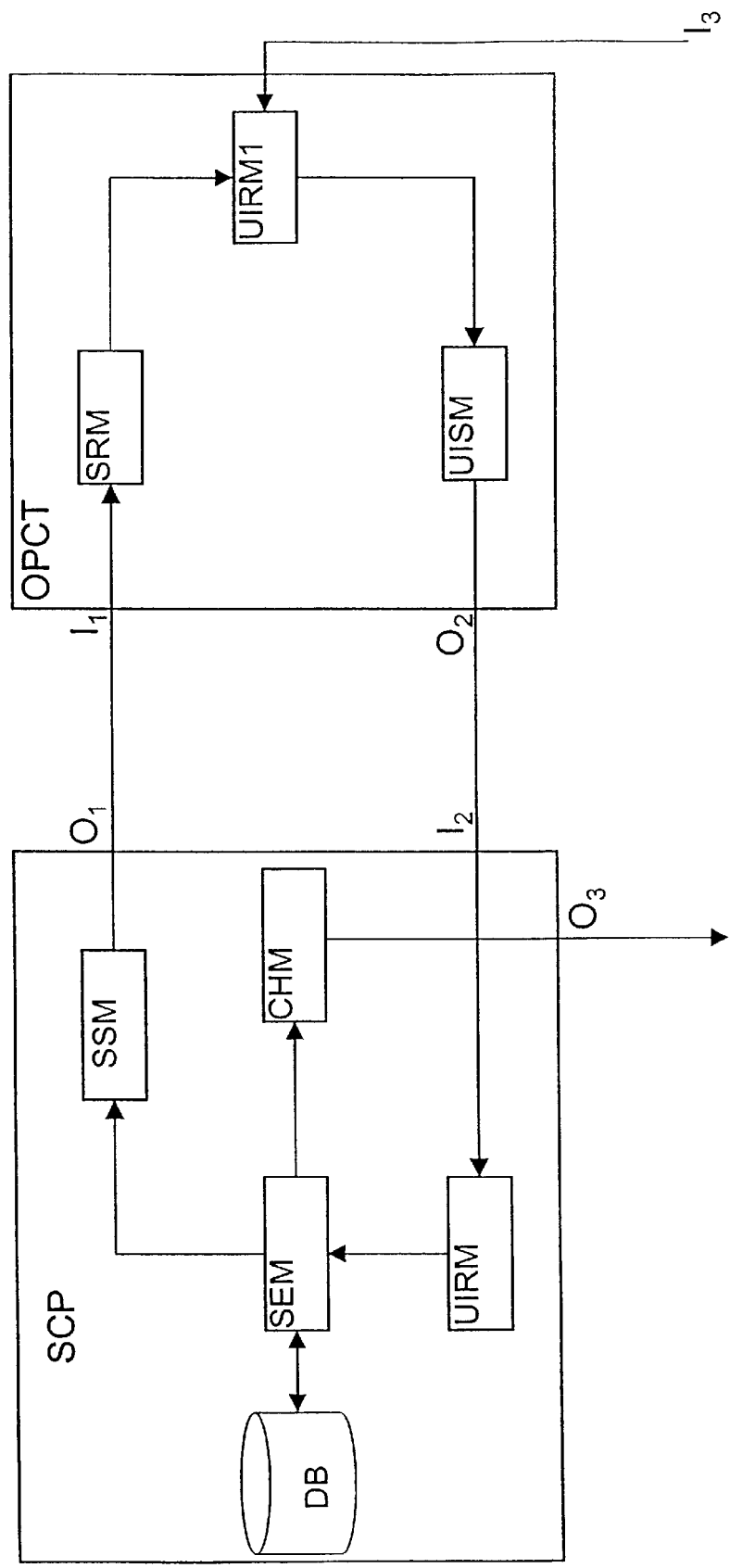

The above and other objects and features of the invention will become more apparent and the invention itself will be best understood by referring to the following description of an embodiment taken in conjunction with the accompanying drawings wherein:

FIG. 1 represents an Intelligent Network IN wherein the method for enabling user interaction between a user-terminal UT and a service control point SCP is performed; and FIG. 2 represents the functional built-up of the service control point SCP and the operator position computer terminal OPCT as presented in FIG. 1.

In the following paragraphs, referring to the drawings, an implementation of the present invention will be described. In the first paragraph of this description, the main elements of the Intelligent Network IN as presented in FIG. 1 wherein the method for enabling user interaction between a user-terminal UT and a service control point SCP is executed, is described. This part is succeeded by a description of all interconnections of the former mentioned Intelligent Network IN elements. Further, special attention will be drawn to the components of the service control point SCP and the components of the operator position computer terminal OPCT as presented in FIG. 2. In the succeeding paragraph, all connections between the before mentioned network elements and described components are defined. In the subsequent paragraph the actual execution of the service provisioning is described.

The essential elements of the Intelligent network, further referred to as IN, are the service control point SCP, which is the central control of the IN executing a service if a calling party makes an IN-call by dialling a special IN telephone number. Then there is a service switching point SSP that at first takes care of detecting the dialling of a special IN telephone number, and if such number is dialled it triggers the service control point SCP to start the execution of the corresponding service. Further the service switching point SSP handles the establishment of the telephone connection between the calling party and the eventual called party. The additional intelligent peripheral IP includes an announcement machine for playing announcements to any party within the meaning of an IN call and having capabilities to eventual receive digits from an IN call party. Then there is an IN operator position OP including a telephone terminal OPTT and a computer terminal OPCT. At last there is a user terminal UT that is a commonly known telephone terminal. In order to keep the description simple it is chosen to only describe one service switching point SSP and only one user terminal UT although there normally will be more than one service switching point and a plurality of user terminals present in such an Intelligent Network IN.

The service control point SCP is connected to the service switching point SSP over a N7 connection. The intelligent peripheral IP is connected to the service control point SCP over a N7 interface or TCP/IP interface and on the other side to the service switching point SSP via a telephonic link. Further there is a coupling between the service control point SCP and an operator position computer terminal OPCT via a TCP/IP connection. At last the operator position telephone terminal OPTT is coupled to the service switching point SSP via a common known twisted pair copper wire used for PSTN telephone connections. The user terminal UT is also coupled to the service switching point SSP via a common known twisted pair copper wire used for PSTN telephone connections.

The service control point SCP, as presented in FIG. 2, is built up of the service executing means SEM that is able to execute the service at service invocation. Further there is a screen sending means SSM that is able to send a display to the computer terminal OPCT of the operator position, where the display requests for user information. The connection handling means CHM, further is adapted to handle the establishment of a PSTN telephone connection, under control of the service executing means SEM, between a user terminal, such as user terminal UT and the telephone terminal OPTT at the operator position OP. At last there is a user information reception means UIRM, that is able to receive information sent by the operator position computer terminal OPCT.

The screen sending means SSM is coupled with an input to an output of the service executing means SEM and has an output-terminal that is at the same time an output-terminal $O_1$ of the service control point SCP.

The connection handling means CHM, in its turn, is coupled with an input to an output of the service executing means SEM. The connection handling means CHM also has an output-terminal that is at the same time an output-terminal $O_3$ of the service control point SCP.

The user information reception means UIRM is coupled with an output to an input of said service executing means SEM and further has an input-terminal that is at the same time an input-terminal $I_2$ of the service control point SCP.

The operator position computer terminal OPCT, as presented in FIG. 2, subsequently, is built up of a screen reception means SRM, that is able to receive a display sent by said service control point SCP, where the screen requests the operator position computer terminal OPCT for user information on a user of a user terminal such as the user terminal UT. The user information reception means UIRM1 is adapted to receive this user information which is inputted by the operator and the user information sending means UISM is adapted to send the user information from the operator position computer terminal OPCT towards the service control point SCP.

The screen reception means SRM has an input-terminal that is at the same time an input-terminal $I_1$ of the operator position computer terminal OPCT. The screen reception means SRM is further coupled with an output to an input of the user information reception means UIRM1 that in its turn is coupled with an output to an input of the user information sending means UISM. Further, the user information reception means UIRM1 has an input-terminal that is at the same time an input-terminal $I_3$ of the operator position computer terminal OPCT. The user information sending means UISM has an output-terminal that is at the same time an output-terminal $O_1$ of the operator position computer terminal OPCT.

In order to explain the operation of the present invention it is assumed that a user at user terminal UT dialled an IN telephone number. The service switching point SSP searches this dialled number in a triggering-table of the service control point SSP containing all subscribed IN service numbers. When the IN telephone number is found in the triggering table, call data like the calling party number are sent to the service control point SCP and the service at the service control point SCP is invoked and starts executing.

It is further assumed that the service, at a certain point of execution needs the input of a pin-code, authorisation-code or an account-code in the form of a sequence of digits. The service executing means SEM of the service control point SCP then instructs, more specific by executing a service independent block of the service, handling announcements and digit reception, the intelligent peripheral IP to send an announcement requesting the meant input and subsequently collecting the digits entered by the calling party. The input of the calling party is forwarded to the service control point SCP that receives the input and proceeds executing the service script using this received input.

At this point it is assumed that the calling party has a problem in the form of absent DTMF-capabilities of the calling party's user terminal. Problems of the calling party user may also be due to the entering of a number consisting of a large number of digits to dial. In this situation, the service proceeds after some successive "not successful" attempts with invoking the help of an operator at the operator position OP. A dedicated service independent block of the service executed by the service executing means SEM then steers the screen sending means SSM to send a display towards the operator position computer terminal OPCT via $O_1$, requesting the operator who is present at the operator position OP to request the calling party for the necessary user information.

In the mean time the service executing means SEM executing the same dedicated service independent block of the service, instructs the connection handling means CHM to handle the establishment of a connection between the calling party user terminal UT and the telephone terminal OPTT of the operator position OP, via $O_3$ by instructing the service switching point SSP.

The operator in the mean time reads the question he has to ask the calling party user and subsequently requests the calling party user for the digits of the needed number. The answer of the calling party user then is entered via the keyboard of the operator position computer terminal OPCT, via $I_3$ and received by the user information reception means UIRM1. The user information sending means UISM, in its turn sends the user information in the form of the by the operator entered digits, via $O_2$, towards the service control point SCP. The user information reception means UIRM of the service control point SCP receives the entered digits and forwards them to the service executing means SEM that uses them in the service execution for handling the IN service call. The service executing means subsequently instructs the connection handling means CHM to release the connection via $O_3$ by instructing the service switching point SSP.

It is to be remarked that in some kind of IN service, instead of the calling party, the called party may be requested to enter an account number or other kind of user information in the form of a sequence of digits as described for the calling party. In case the called party has problems entering the digits for some reason the operation of the present invention is done in the same way as described in the previous embodiment concerning the calling party, but differing in so far that there is a telephone connection established between the operator position telephone terminal and the user terminal of the called party.

It is further to be remarked that instead of the above described implementation of a single operator position also a call centre consisting of a number of such operator positions can be implemented.

Although the above embodiments of the invention have been described by means of functional blocks, their detailed realisation based on their functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

What is claimed is:

1. A method for enabling user interaction between a user terminal and at least one service control point comprising a service execution unit that is adapted to execute a service in an intelligent network, said intelligent network further comprising at least one service switching point coupled to said at least one service control point, said method comprises:
- a screen sender of said at least one service control point sending a command to a computer terminal of an operator position, said operator position further comprising a telephone terminal coupled to said service switching point, said command requesting user information;
- a connection handler of said service switching point establishing a connection between said user terminal and said operator position telephone terminal under the control of said service execution unit; and
- said operator position computer terminal sending requested user information to a user information receiver of said at least one service control point, said user information receiver being coupled to said service execution unit.

2. A service control point for enabling user interaction between a user terminal and said service control point and for coupling to a service switching point in an intelligent network, said service control point comprising:
- a service execution unit adapted to execute a service;
- a screen sender, having an input coupled to an output of said service execution unit and adapted to send a command to a computer terminal of an operator position, said command requesting user information;
- a connection handler, having an input coupled to an output of said service execution unit and adapted to establish a connection, under control of said service execution unit, between said user terminal and a telephone terminal at said operator position, said telephone terminal being coupled to said service switching point; and
- a user information receiver, having an output coupled to an input of said service execution unit and adapted to receive information sent by said operator position computer terminal.

3. An operator position computer terminal for enabling user interaction between a user terminal and at least one service control point in an intelligent network, said intelligent network further comprising at least one service switching point coupled to said at least one service control point, said operator position computer terminal comprising:
- a screen receiver, adapted to receive a command that requests user information, said command being sent by a screen sender of said at least one service control point, said screen receiver requesting said operator position computer terminal for user information on said user terminal, said operator position computer terminal being coupled to said at least one service control point by a connection handler of said at least one service control point;
- a user information receiver, having an input coupled to an output of said screen receiver and adapted to receive said user information; and
- a user information sender, having an input coupled to an output of said user information receiver, and adapted to send said user information from said operator position computer terminal towards a user information receiver of said at least one service control point.

4. A call center comprising a plurality of operator position computer terminals as specified in claim 3.

5. A software module for running on a processing system for inclusion in a service control point for enabling user interaction between a user terminal and said service control point and for coupling to a service switching point in an intelligent network, said software module comprising the following software sub-modules:
- a service executing sub-module, adapted to execute a service;
- a screen sending sub-module, co-operating with said service executing sub-module and adapted to send a command to a computer terminal of an operator position, said command requesting user information;
- a connection handling sub-module, co-operating with said service executing sub-module and adapted to establish a connection, under control of said service executing sub-module, between said user terminal and a telephone terminal at said operator position, said telephone terminal being coupled to said service switching point; and
- a user information reception sub-module, co-operating with said service-executing sub-module and adapted to receive information sent by said operator position computer terminal.

6. A software module for running on a processing system for inclusion in operator position computer terminal for enabling user interaction between a user terminal and at least one service control point in an intelligent network, said intelligent network further comprising at least one service switching point coupled to said at least one service control point, said software module comprising:
- a screen reception sub-module, adapted to receive a command that requests user information, said command being sent by a screen sending sub-module of said at least one service control point, said screen reception sub-module requesting said operator position computer terminal for user information on said user terminal, said operator position computer terminal being coupled to said at least one service control point by a connection handling sub-module of said at least one service control point;
- a user information reception sub-module, co-operating with said screen reception sub-module and adapted to receive said user information; and
- a user information sending sub-module, co-operating with said user information reception sub-module and adapted to send said user information from said operator position computer terminal towards a user information receiving sub-module of said at least one service control point.

* * * * *